United States Patent [19]
Ohtake

[11] Patent Number: 5,497,751
[45] Date of Patent: Mar. 12, 1996

[54] SAFETY CONTROL APPARATUS FOR RECIPROCATING ENGINE

[75] Inventor: Yukio Ohtake, Susono, Japan

[73] Assignee: Toyota Jidosha Kabushiki Kaisha, Toyota, Japan

[21] Appl. No.: 395,755

[22] Filed: Feb. 27, 1995

[30] Foreign Application Priority Data

Mar. 4, 1994 [JP] Japan .................................. 6-034784

[51] Int. Cl.$^6$ .................................................. F02M 51/00
[52] U.S. Cl. ........................................................ 123/479
[58] Field of Search ................................. 123/479, 480, 123/399; 364/424.01

[56] References Cited

U.S. PATENT DOCUMENTS

| | | | |
|---|---|---|---|
| 4,974,563 | 12/1990 | Ikeda et al. | 123/494 |
| 5,295,471 | 3/1994 | Ridgeway et al. | 123/479 |
| 5,305,216 | 4/1994 | Okura et al. | 364/424.01 |
| 5,331,560 | 7/1994 | Tamura | 364/431.12 |
| 5,339,782 | 8/1994 | Golzer et al. | 123/399 |

FOREIGN PATENT DOCUMENTS

| | | | |
|---|---|---|---|
| 60-22202 | 2/1985 | Japan | 123/479 |
| 60-132041 | 7/1985 | Japan | 123/479 |
| 60-244650 | 12/1985 | Japan | 123/479 |
| 61-49154 | 3/1986 | Japan | 123/479 |
| 61-201135 | 9/1986 | Japan | 123/479 |
| 62-49233 | 3/1987 | Japan | 123/479 |
| 63-297771 | 12/1988 | Japan | 123/479 |
| 2-115552 | 4/1990 | Japan | 123/479 |
| 2-176141 | 7/1990 | Japan | 123/479 |

*Primary Examiner*—Raymond A. Nelli
*Attorney, Agent, or Firm*—Kenyon & Kenyon

[57] ABSTRACT

A safety control apparatus for a reciprocating engine equipped with two control systems to be able to sufficiently cope with a false normal state in which a normal state signal is output to an observation circuits of the control system despite the fact that an abnormal output has been fed to the actuators of the fuel injection system or the ignition system as a result of an abnormal operation in the control unit in the control systems. The pair of control systems are provided with a false normal state detection circuits for detecting the false normal state in addition to the provision of first and second control units for controlling the engine and an operation observation circuit therefor. When the false normal state detection circuit judges that the control system now in operation is abnormal, the engine control system is changed over to the standby system via the output change-over circuit to safely control the engine. When it is attempted to detect abnormality in the fuel injection system by the false normal state detection circuit, an occurrence of misfiring in at least any one of the cylinders of the engine is detected and when it is attempted to detect an abnormality in the ignition signal, a judgement is rendered that ignition timing is abnormal when the ignition timing of at least any one of the cylinders of the engine lies outside the normal range of ignition timing, and the engine control system is changed over to the standby system. This makes it possible to safely control the fuel injection timing and the ignition timing of a multi-cylinder reciprocating engine.

15 Claims, 9 Drawing Sheets

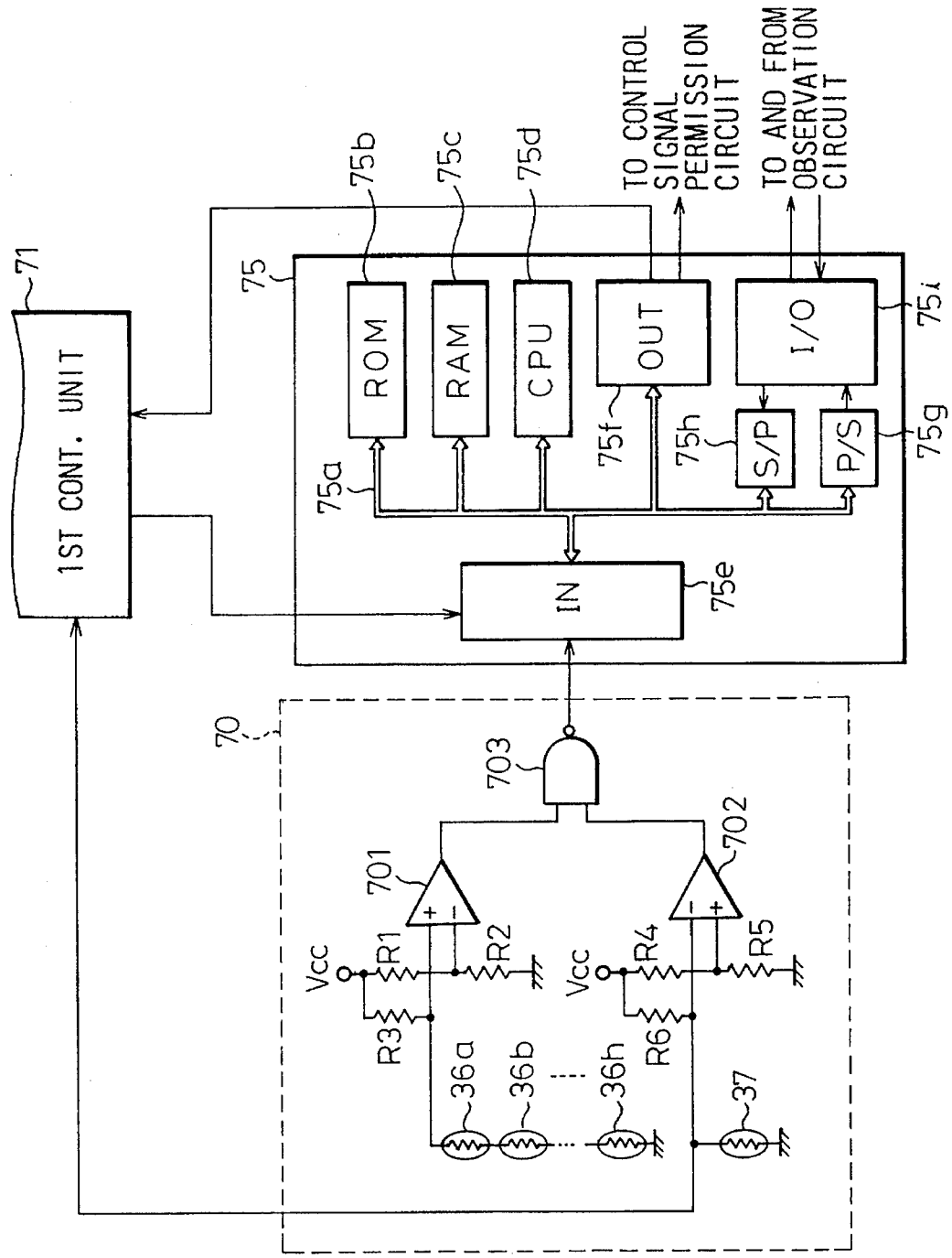

SAFETY CONTROL APPARATUS FOR RECIPROCATING ENGINE

BACKGROUND OF THE INVENTION

1. Field of the Invention

The present invention relates to a safety control apparatus for an internal combustion engine. More specifically, the invention relates to a safety control apparatus for a reciprocating engine and, more concretely, to a safety control apparatus for a reciprocating engine employed in a small aircraft.

2. Description of the Related Art

In general, a control system for an engine for an aircraft is controlled by a computer. The control system for an engine for an aircraft must maintain a high degree of safety and is, generally, constituted or a redundant system equipped with a pair of computer control systems and an observation circuit for changing over the pair of control systems.

As for the failure rate for the engine for an aircraft, it must satisfy very stringent criteria, since the engine is heavy and seriously affects the center of gravity of aircraft and, hence, affects the controllability of aircraft. In particular, the probability of serious troubles in the engine must be less than 1/1,000,000,000. In practice, however, such a stringent criterion cannot be accomplished by a simply constructed pair of systems relying upon computer systems using relatively cheap control CPUs.

In the computer systems using a relatively cheap control CPU, it may often happen that a normal state signal is output to an observation circuit despite the fact that the CPU is malfunctioning and is sending an abnormal output to the actuator. The state where a normal signal is output to the observation circuit during the abnormal condition is called a false normal state. In practice, the probability of generation of such a false normal state becomes higher than the probability of a serious problem. In a computer system for aircraft, therefore, the false normal state must be separately detected and the control system must be changed over to maintain a high degree of safety.

In an engine controller for a large aircraft that uses a gas turbine engine, a rotational speed sensor for detecting the rotational speed of the gas turbine is provided in order to enhance safety for the false normal state. The rotational speed sensor detects the overrunning of the gas turbine and, when overrunning of the gas turbine is detected, the rotational sensor renders the decision that one control system is in the false normal state and changes the control system over to another control system.

Here, the gas turbine engine used for large aircraft uses a continuous combustion system which makes it possible to execute computation control relying upon the detected parameters by regarding the system as a model and, hence, makes it possible to execute the control in a continuous manner. In the case of the gas turbine engine, therefore, a false normal state in the control system caused by the overrunning of the engine can be easily detected.

However, in a reciprocating engine used, for example, in a small aircraft, the combustion takes place intermittently, and it is difficult to express the process of combustion in the form of a mathematical expression. Therefore, the engine has been intermittently controlled relying chiefly upon the timing control. At the moment when the overrunning of the engine is detected, therefore, it is too late and the engine may have been damaged already. Therefore, a controller for reciprocating engines has not been fully furnished with countermeasure against the false normal state.

SUMMARY OF THE INVENTION

The object of the present invention is to provide a safety control apparatus which is capable of fully coping with a false normal state in a controller for a reciprocating engine.

Concretely speaking, the present invention provides a safety control apparatus for a reciprocating engine which is capable of realizing a computer-controlled system using relatively cheap CPUs by detecting a state which is likely to establish a false normal state in the reciprocating engine controller by detecting misfire or pre-ignition of the engine.

According to one aspect of the present invention, there is provided a safety control apparatus for a reciprocating engine comprising a pair of control systems including a pair of electronic control units for controlling the fuel injection of an engine, observation means for the pair of electronic control units, and a change-over means which, when one control unit is judged to be in an abnormal state by the observation means for the control units, changes the control unit over to the other control unit; and a misfire detection means for detecting a misfire in at least any one of the cylinders of the engine. In the safety control apparatus for the reciprocating engine, the observation means of the control units detects that one of the control units is in the false normal state in response to the misfire detected by the misfire detection means and changes the control of the engine over to the other control unit.

According to another aspect of the present invention, there is provided a safety control apparatus, for a reciprocating engine, comprising a pair of control systems including a pair of control units for controlling the ignition of an engine, observation means for the pair of control units, and a change-over means which, when one control unit is determined to be in an abnormal state by the observation means for the control units, changes the control unit over to the other control unit; and an ignition timing detection means for detecting whether the ignition timing in at least any one of the cylinders of the engine is normal or not. In the safety control apparatus for the reciprocating engine, the observation means for the control units determines that one of the control units is in the false normal state in response to the abnormality detected by the ignition timing detection means and changes the control of the engine over to the other control unit.

According to the safety control apparatus for a reciprocating engine constituted according to the first aspect, a misfire which is a cause of serious trouble in the reciprocating engine is effectively detected. Upon detecting the misfire, the state in which the controller is liable to be placed in the false normal operation is detected, making it possible to change over the control channel in the pair of control systems. This makes it possible to reliably prevent the reduction gear of the engine being damaged due to a great change in the torque caused by a misfire.

According to the safety control apparatus for a reciprocating engine constituted according to the second aspect, pre-ignition, which is another cause of serious trouble in the reciprocating engine, is anticipated, and the state in which the controller is liable to be placed in the false normal operation is determined from the anticipation, making it possible to change over the control channel in the pair of control systems. This makes it possible to reliably prevent the piston being melted and the engine being damaged due to pre-ignition caused by an advance in the ignition timing.

BRIEF DESCRIPTION OF THE DRAWINGS

The present invention will be more clearly understood from the description as set forth below with reference to the accompanying drawings, wherein:

FIG. 5 is a diagram illustrating the misfire detection circuit and observation circuits, for the first and second control units, having another constitution;

DESCRIPTION OF THE PREFERRED EMBODIMENTS

Figure 1A:
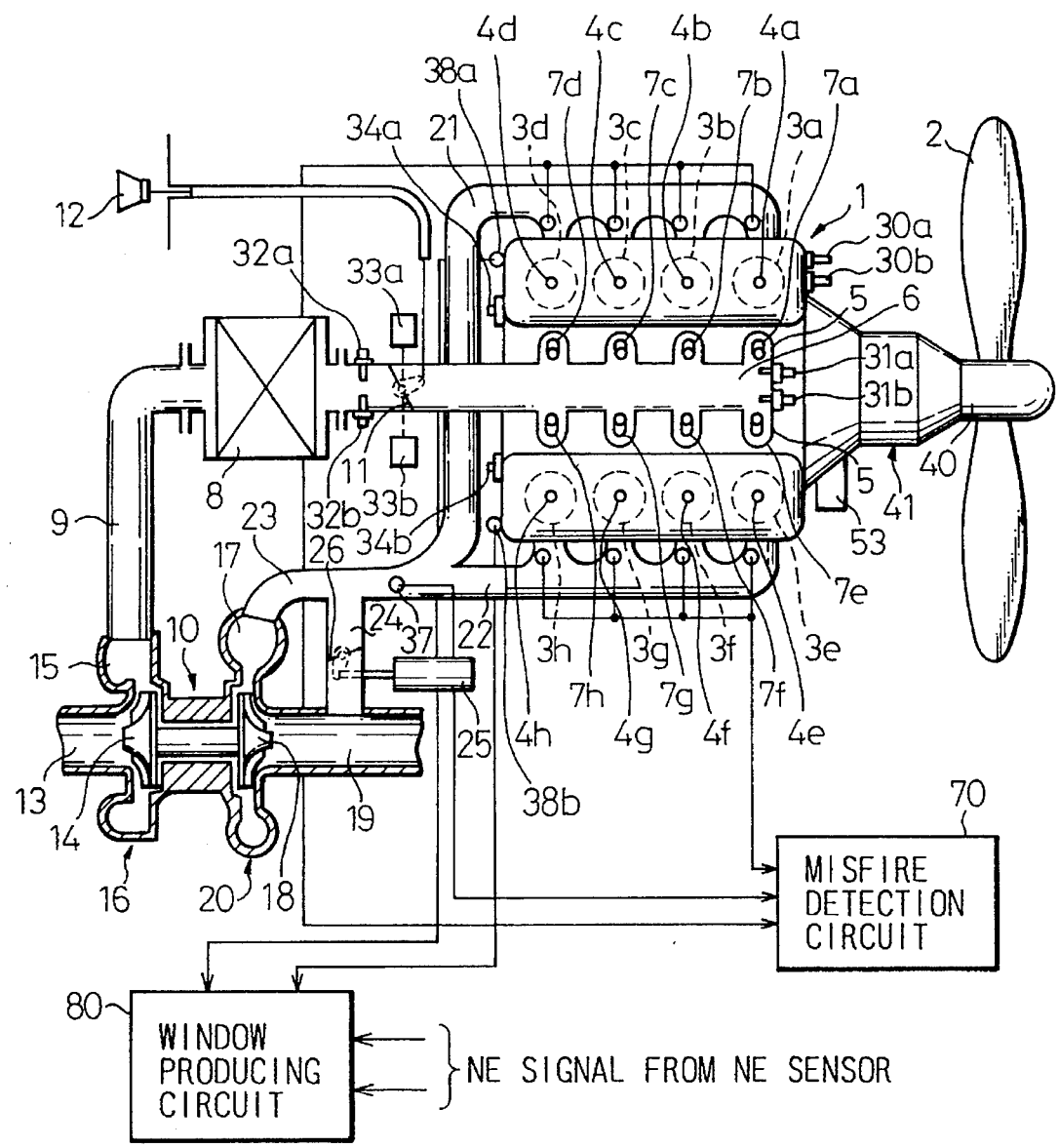
FIG. 1A is a diagram illustrating the constitution of an engine for an aircraft to which a first embodiment of the present invention is adapted.

FIG. 1A illustrates the constitution of an engine for aircraft to which a first embodiment of the present invention is adapted and shows a reciprocating internal combustion engine 1 for driving a propeller 2 of aircraft. In the embodiment shown in FIG. 1A, the internal combustion engine 1 is comprised of a spark ignition type 8-cylinder V-type internal combustion engine where the cylinders 3a, 3b, 3c, 3d, 3e, 3f, 3g and 3h are respectively provided with single spark plugs 4a, 4b, 4c, 4d, 4e, 4f, 4g and 4h. Further, the cylinders 3a to 3h are connected to a common intake duct 6 through corresponding intake branch pipes 5. In the intake branch pipes 5 are arranged fuel injectors 7a, 7b, 7c, 7d, 7e, 7f, 7g and 7h. The intake duct 6 is connected to an exhaust turbocharger 10 through an intercooler 8 and an intake duct 9. In the intake duct 6 downstream of the intercooler 8 is disposed a throttle valve 11. The throttle valve 11 is connected to a throttle lever 12 provided at the pilot's seat.

The turbocharger 10 is comprised of a compressor 16 which includes an air intake pipe 13, an impeller 14, and a compressor scroll chamber 15 and an exhaust turbine 20 which includes a turbine scroll chamber 17, a turbine wheel 18, and an exhaust gas discharge pipe 19. The scroll chamber 15 of the compressor 16 is connected to the intake duct 9. On the other hand, the cylinders 3a, 3b, 3c and 3d are connected to a common exhaust manifold 21, while the remaining cylinders 3e, 3f, 3g and 3h are connected to a common exhaust manifold 22. These exhaust manifolds 21 and 22 are connected to a common exhaust pipe 23, which exhaust pipe 23 is connected to the scroll chamber 17 of the exhaust turbine 20. The turbine wheel 18 is made to turn by the exhaust gas discharged from the cylinders 3a to 3h. By this, the impeller 14 is made to turn. When this happens, the air which is raised in pressure by the compressor 16 is fed to the cylinders 3a to 3h through the intake duct 9, the intercooler 8, the intake duct 6, and the corresponding intake branch pipes 5. On the other hand, an exhaust bypass pipe 24 is branched from the exhaust pipe 23. This exhaust bypass pipe 24 is connected to the exhaust gas discharge pipe 19. In the exhaust bypass pipe 24 is arranged a waste gate valve 26 controlled by an actuator 25. When the opening of the waste gate valve 26 becomes larger, the amount of the exhaust gas fed to the turbine wheel 18 falls, so the rotational speed of the turbine wheel 18 falls and as a result the air pressure in the intake duct 9, that is, the supercharging pressure, falls. Therefore, by controlling the opening of the waste gate valve 26, it is possible to control the supercharging pressure.

As shown in FIG. 1A, a pair of rotational speed sensors (hereinafter referred to as NE sensors) 30a and 30b are attached to the engine body 1 to detect the engine rotational speed NE. Further, a pair of pressure sensors (hereinafter referred to as PM sensors) 31a and 31b are attached inside the intake duct 6 downstream of the throttle valve to detect the pressure PM in the intake duct 6. Still further, a pair of pressure sensors (hereinafter referred to as PD sensors) 32a and 32b are attached inside the intake duct 6 between the intercooler 8 and the throttle valve 11 so as to detect the deck pressure PD, that is, the supercharging pressure. Also, the throttle valve 11 has mounted in it a pair of opening sensors (hereinafter referred to as TA sensors) 33a and 33b for detecting the opening TA of the throttle valve 11. A pair of water temperature sensors (hereinafter referred to as TW sensors) 34a and 34b are attached to the engine body to detect the temperature TW of the engine coolant water.

Furthermore, exhaust temperature sensors 36a, 36b, 36c, 36d, 36e, 36f, 36g and 36h are arranged in the exhaust manifolds 21 and 22 near the exhaust ports of the cylinders of the engine 1, and an exhaust temperature sensor 37 is disposed in the common exhaust pipe 23 to detect the exhaust temperature at the manifold portion of the exhaust pipe. Outputs of the exhaust temperature sensors 36a to 36h that detect exhaust temperatures at the exhaust ports and the output of the exhaust temperature sensor 37 in the manifold portion of the exhaust pipe, are input to a misfire detection circuit.

Cam position sensors 38a and 38b are attached at predetermined portions of the engine 1. Outputs of the cam position sensors 38a and 38b are input to a control circuit that is not shown and are further input to a window producing circuit 80 that produces ignition timing range signals.

The window producing circuit 80 is also supplied with rotational speed signals NE from the NE sensors 30a and 30b.

Figure 2:
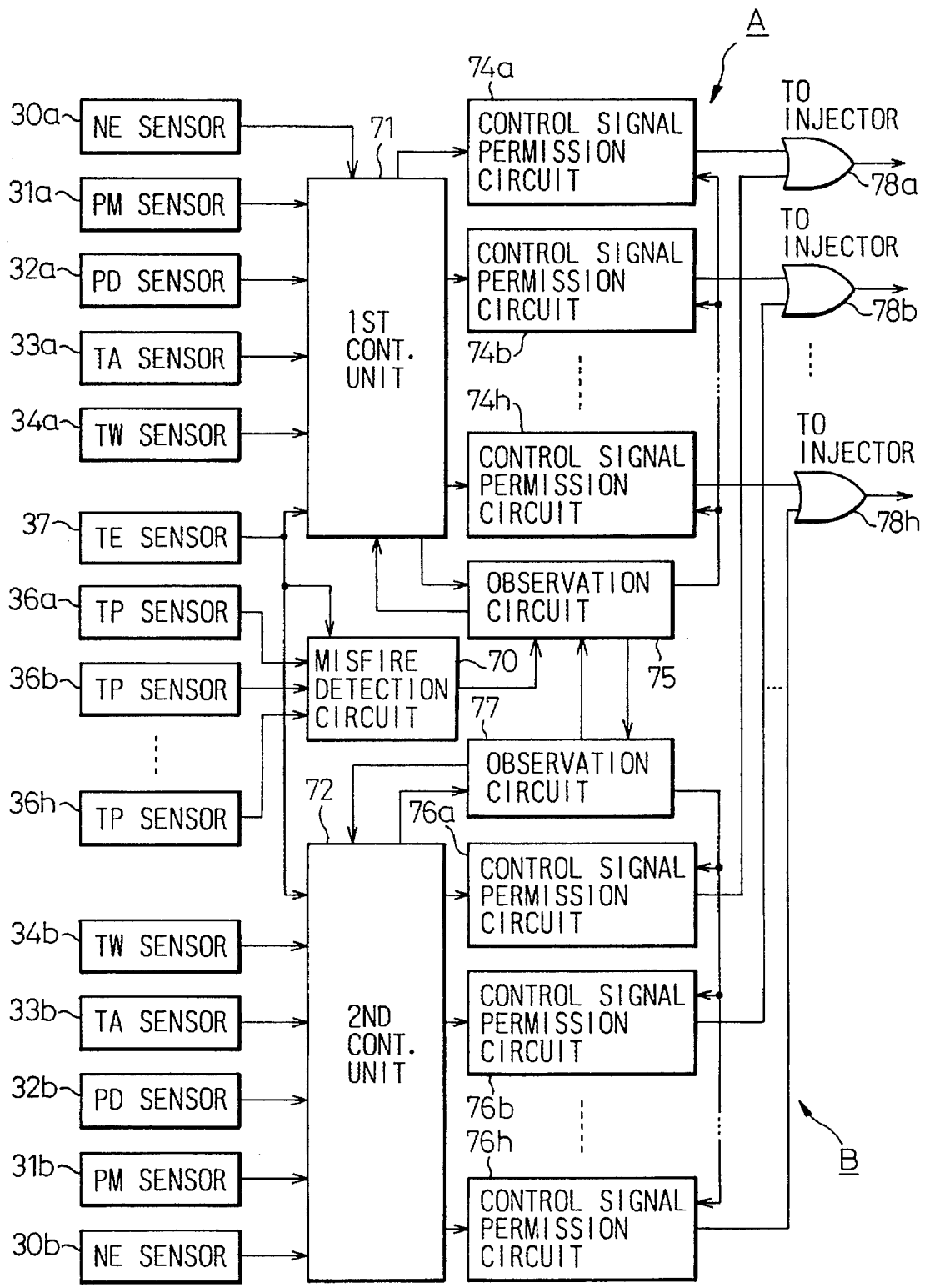
FIG. 2 is a block diagram schematically illustrating the constitution of a safety control apparatus for a reciprocating engine according to the first embodiment of the present invention.

FIG. 2 is a block diagram which schematically illustrates the constitution of the safety control apparatus for a reciprocating engine according to a first embodiment of the present invention. The control system according to this embodiment is constituted by two channels, i.e., a first control system A equipped with a first control unit 71 and a second control system B equipped with a second control unit 72.

To the first and second control units 71 and 72 are connected a variety of sensors for detecting engine-running-condition parameters, such as NE sensors 30a and 30b, PM sensors 31a and 31b, PD sensors 32a and 32b, TA sensors 33a and 33b, and TW sensors 34a and 34b. To the first and second control units 71 and 72 is further connected the exhaust temperature sensor (referred to as TE sensor) 37 disposed in the manifold portion of the exhaust pipe explained with reference to FIG. 1A. The TE sensor 37 is also connected to the misfire detection circuit 70. Furthermore, in order to detect discharge temperatures at the exhaust ports of the engine, the exhaust temperature sensors 36a to 36h (see FIG. 1A), disposed in the branch pipes of the exhaust manifolds 21 and 22, are connected to the misfire detection circuit 70.

The first control system A is constituted by eight control signal permission circuits 74a to 74h (which are enabling circuits, and only three of them are diagramed) connected to the output stage of the first control unit 71, a control unit observation circuit 75, and OR circuits 78a to 78h connected to actuators for driving injectors that are not shown. The misfire detection circuit 70 is connected to the control unit observation circuit 75, so that the output signal of the control unit observation circuit 75 is input to the first control unit 71 and to eight control signal permission circuits 74a to 74h.

Similarly, the second control system B comprises eight control signal permission circuits 76a to 76h (only three of them are shown in the drawing) connected to the output stage of the second control unit 72, and a control unit observation circuit 77, the outputs of eight control signal permission circuits 76a to 76h being connected to inputs on one side of the OR circuits 78a to 78h in the first control system A. The control unit observation circuit 75 in the first control system A and the control unit observation circuit 77 in the second control system B exchange signals relative to each other.

Described below, first, is the case where the first control system A is in operation. In this case, detection signals from a variety of sensors, such as engine rotational speed NE, intake pressure PM, supercharging pressure PD, throttle circuit TA, cooling water temperature TW and exhaust gas temperature TE are input to the first control unit 71 regularly or in synchronism with the rotation of the engine. The control outputs to the injector actuators calculated by the first control unit 71 are input to the control signal permission circuits 74a to 74h. The first control unit 71 is observed by the control unit observation circuit 75, and sends a reply signal to the control unit observation circuit 75 in response to a request signal from the control unit observation circuit 75. The control unit observation circuit 75 controls the control signal permission circuits 74a to 74h as described below depending upon the operation condition of the first control unit 71.

(1) When the first control unit 71 is normally operating.

A control signal is permitted to be output to the output OR circuits 78a to 78h from the first control unit 71 through the control signal permission circuits 74a to 74h.

(2) When the first control unit 71 is abnormal.

A control signal is not permitted to be output from the first control unit 71 to the output OR circuits 78a to 78h through the control signal permission circuits 74a to 74h, and a signal representing that the first control signal A is abnormal is output to the control unit observation circuit 77 in the second control system B.

When the control unit observation circuit 77 of the second control system B is informed of an abnormality in the first control system A, the control unit observation circuit 77 of the second control system B allows the control signal to be output to the output OR circuits 78a to 78h from the second control unit 72 through the control signal permission circuits 76a to 76h of the second control system B provided the second control unit 72 is not abnormal. Thus, the first control system A is changed over to the second control system B.

Next, when the second control system B is in operation, detection signals from a variety of sensors, such as engine rotational speed NE, intake pressure PM, supercharging pressure PD, throttle circuit TA, cooling water temperature TW and exhaust gas temperature TE are input to the second control unit 72 regularly or in synchronism with the rotation of the engine. The control outputs to the injector actuators calculated by the second control unit 72 are input to the control signal permission circuits 76a to 76h. The second control unit 72 is observed by the control unit observation circuit 77, and sends a reply signal to the control unit observation circuit 77 in response to a request signal from the control unit observation circuit 77.

The control unit observation circuit 77 observes the control signal permission circuits 76a to 76h in accordance with the operation condition of the second control unit 72 in the same manner as the control unit observation circuit 75 of the first control unit 71 observes the control signal permission circuit 74a to 74h. That is, when the first control unit 72 is operating normally, a control signal is permitted to be output to the output OR circuits 78a to 78h from the second control unit 72 through the control signal permission circuits 76a to 76h. When the second control unit 72 is abnormal, a control signal is not permitted to be output from the second control unit 72 to the output OR circuits 78a to 78h through the control signal permission circuits 76a to 76h, and a signal representing that the second control system B is abnormal is output to the control unit observation circuit 75 in the first control system A.

When the control unit observation circuit 75 of the first control system A is informed of the abnormality of the second control system B, the control unit observation circuit 75 of the first control system A renders the control signal to be output to the output OR circuits 78a to 78h from the first control unit 71 through the control signal permission circuits 74a to 74h of the first control system A provided the first control unit 71 is not abnormal. Thus, the second control system B is changed over to the first control system A.

When either one of the control unit 71 or 72 is abnormal in the pair of control systems A and B according to the first embodiment as described above, the engine control is changed over to the other control system. Therefore, the control signal is output to the injector actuators through either the control signal permission circuits 74a to 74h or the control signal permission circuits 76a to 76b.

Next, described below is the misfire detection circuit 70 according to the first embodiment. To the misfire detection circuit 70 are input detection signals from the TP sensors 36a to 36h which are provided near the exhaust ports of the cylinders of the engine to detect exhaust temperatures TP at the exhaust ports, and a detection signal from the exhaust temperature sensor 37 in the manifold portion of the exhaust pipe 23 (see FIG. 1A). Therefore, the misfire detection circuit 70 observes the exhaust temperatures of the cylinders and the exhaust temperature in the manifold portion.

Described below is the detection of misfire in the engine by the misfire detection circuit 70 according to the embodiment. In this embodiment, the misfire detection circuit 70 judges that misfire is occurring in the engine in the following cases.

(a) When at least one detected temperature is lower than 300° C. among the signals from the TP sensors 36a to 36h that detect exhaust temperatures TP at the exhaust ports, and (b) When a signal from the TE sensor 37 indicates that the exhaust temperature TE in the manifold portion is higher than 470° C.

The misfire detection circuit 70 sends a misfire judgement signal to the control unit observation circuit 75 when it has judged that misfire has occurred in the engine. Then, the control unit observation circuit 75 sends an abnormal signal to the control unit observation circuit 77, so that the control of the engine is forcibly changed from the first control unit 71 over to the second control unit 72 by the control unit observation circuit 77. Therefore, even when the first control unit 71 is in the aforementioned false normal state, the engine control system is changed over to continue normal control operation.

In addition to the above-mentioned method, the occurrence of misfire can be judged by the misfire detection circuit 70 in a manner as described below.

(1) A method comprising the steps of: detecting exhaust temperatures of each cylinder by temperature sensors provided at each cylinder; observing the detected exhaust temperature of each cylinder; and judging that a misfire has occurred when at least one of the temperature differences between the exhaust temperatures of each cylinder and the average exhaust temperatures of all cylinders is larger than a misfire judgement value.

(2) A method comprising the steps of: detecting exhaust temperatures of each cylinder by temperature sensors provided at each cylinder; observing the detected exhaust temperatures of each cylinder; and judging that a misfire has occurred when at least one of the temperature differences between the exhaust temperatures of each cylinder is larger than a misfire judgement value.

Figure 1B:
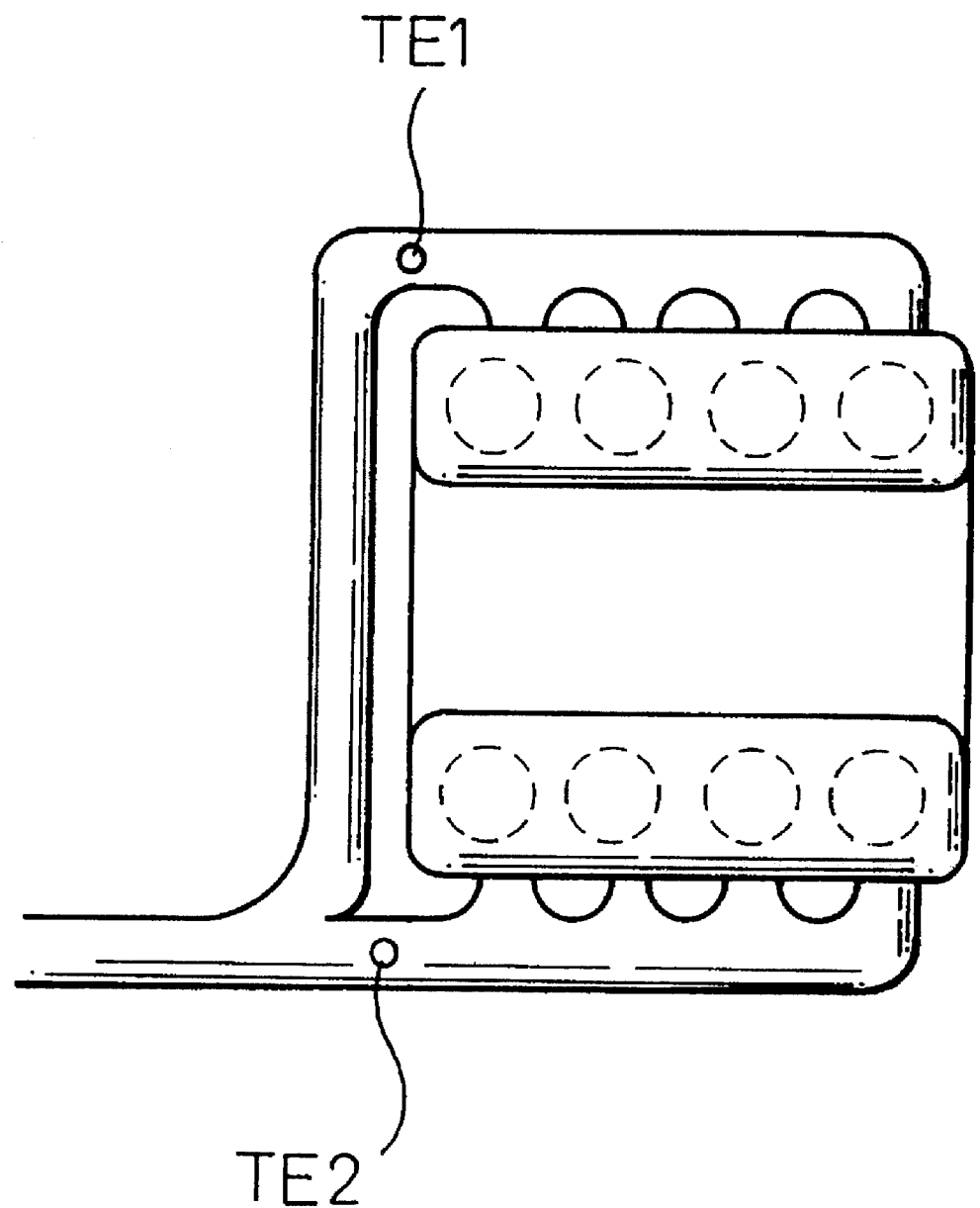
FIG. 1B is a diagram illustrating the position of temperature sensors.

(3) A method for V-type engine having two banks each having an exhaust manifold and temperature sensors TE1 and TE2 provided in each manifold portion, as shown in FIG. 1B, comprising the steps of: detecting exhaust temperatures in each manifold portion by the temperature sensors TE1 and TE2; calculating the absolute difference value between temperatures detected by the temperature sensors TE1 and TE2; and judging that a misfire has occurred when the absolute value is larger than a misfire judgment value.

The above-mentioned constitution according to the first embodiment makes it possible to effectively detect the occurrence of a misfire which is one of the causes of serious trouble in a reciprocating engine. By judging a state in which the control apparatus is likely to be placed in a false normal state by relying upon the detection of a misfire in the engine, furthermore, it is made possible to change over the engine control system. This makes it possible to effectively prevent the occurrence of fatal trouble such as the breakage in the reduction gear of the engine that may result from a sudden change in the torque caused by misfire.

In the above-mentioned embodiment, the occurrence of misfire is detected by utilizing the exhaust temperature which can be detected using a thermistor or a thermocouple. Though the thermistor and the thermocouple do not respond quickly, they are easy to use, require only a simple comparator circuit for detection, and are advantageous in cost. It is further possible to use a torque sensor for detecting a change in the shaft torque or a knock sensor for detecting vibration. When the misfire in the engine is to be detected by using the knock sensor, in particular, it becomes necessary to use the knock sensor of the non-resonance type since the timing to be detected is close to that of a full power condition.

Figure 3:
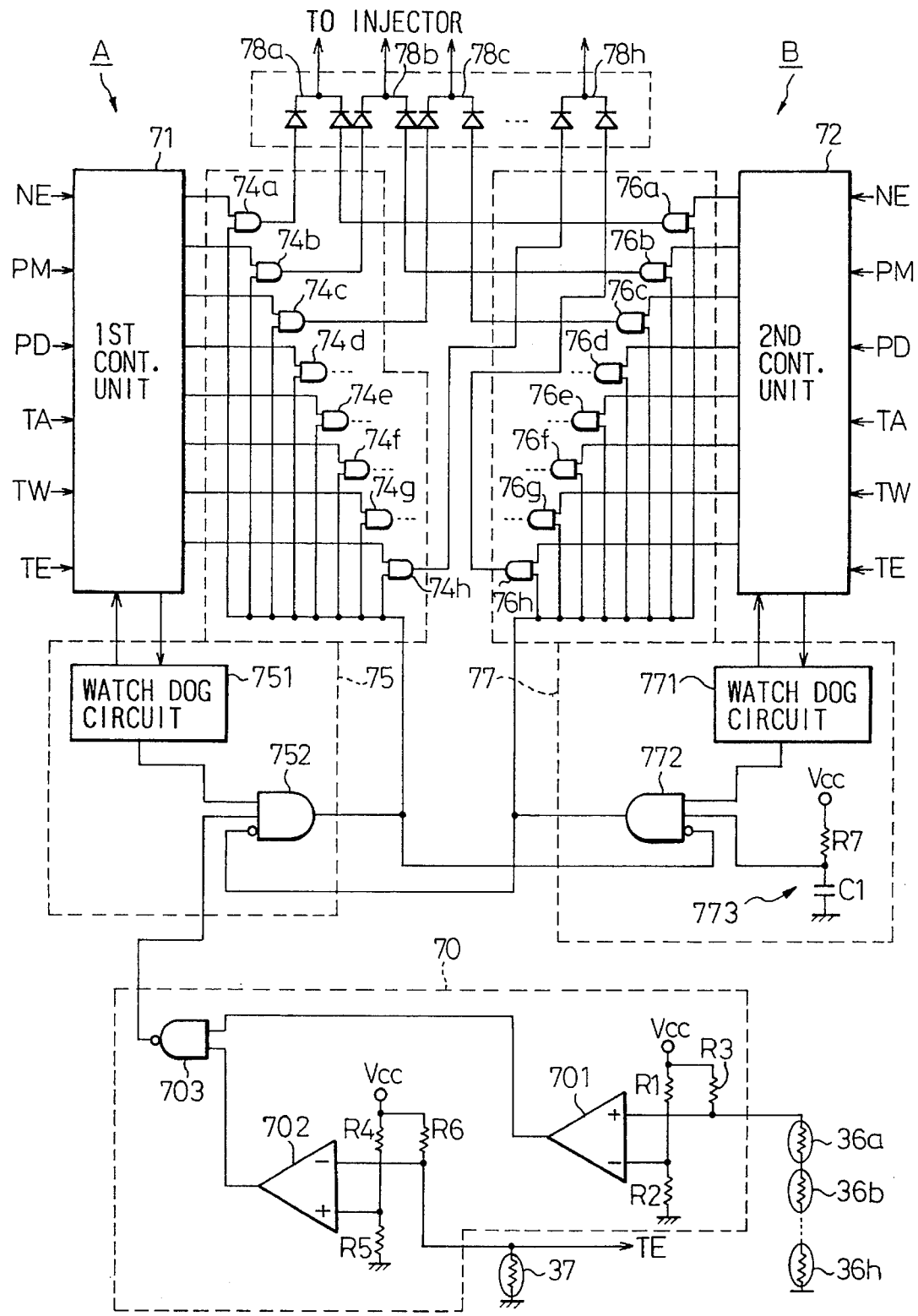
FIG. 3 is a diagram concretely illustrating the constitutions of the misfire detection circuit, the observation circuits for first and second control units, the control signal permission circuits, and the OR circuits in FIG. 2.

FIG. 3 is a circuit diagram which concretely illustrates the internal constitutions of the misfire detection circuit 70, the first and second control unit observation circuits 75 and 77, the control signal permission circuits 74a to 74h and 76a to 76h, and the OR circuits 78a to 78h of FIG. 2.

The misfire detection circuit 70 comprises two comparators 701 and 702, a NAND circuit 703, and a plurality of resistors R1 to R6. To a positive input of the comparator 701 are connected the exhaust temperature sensors 36a to 36h for detecting the exhaust gas temperatures at the exhaust ports. In this embodiment, eight thermistors connected in series are used as exhaust temperature sensors 36a to 36h. To a negative input of the comparator 702 is connected the exhaust temperature sensor 37 for detecting the exhaust gas temperature in the manifold portion of the exhaust pipe. In this embodiment, the exhaust temperature sensor 37 is a thermistor. The connection point between the serially connected resistors R1 and R2 gives a reference comparison voltage to a negative input of the comparator 701, and the connection point between the serially connected resistors R4 and R5 gives a reference comparison voltage to a positive input of the comparator 702. Outputs of the comparators 701 and 702 are input to the NAND circuit 703.

In the thus constituted misfire detection circuit 70, when an ambient temperature (exhaust gas temperature) at one or more thermistors 36a to 36h becomes lower than a setpoint temperature set by the resistors R1 and R2, the resistance of the thermistors 36a to 36h exposed to the exhaust gas of a low temperature increases, whereby an increased voltage is applied to the positive input of the comparator 701. Moreover, when the temperature of the exhaust gas at the site of the thermistor 37 is higher than a setpoint value determined by the resistors R4 and R5, the resistance of the thermistor 37 increases whereby decreased voltage is applied to the negative input of the comparator 702.

Therefore, the setpoint value determined by the resistors R1 and R2 is set to be equal to a voltage that appears at a point where the resistor R3 and the serially connected thermistors 36a to 36h are connected together when the temperature at a given exhaust port becomes 300° C. Then, a voltage applied to the positive input of the comparator 701 increases when the above-mentioned condition (a), i.e., "when at least one detection temperature is lower than 300° C. among the signals from the TP sensors 36a to 36h that detect exhaust temperatures TP at the exhaust ports", is established, and the output of the comparator 701 changes from a low level into a high level. Moreover, the setpoint value determined by the resistors R4 and R5 is set to be equal to a voltage that appears at a point where the thermistor 37 and the resistor R6 are connected together when the exhaust temperature TE in the common exhaust pipe 23 (see FIG. 1A) becomes 470° C. Then, a voltage applied to the negative input of the comparator 702 becomes small when the above-mentioned condition (b), i.e., "when a signal from the TE sensor 37 detecting the exhaust temperature TE at the manifold portion is higher than 470° C.", is established, and the output of the comparator 702 changes from the low level into the high level. When the outputs of the two comparators 701 and 702 are both at a high level, the NAND circuit 703 outputs a low level signal as an inhibition signal.

The first and second control unit observation circuits 75 and 77 are constituted by watchdog circuits 751 and 771 and three-input AND circuits 752 and 772 each having an inverted input. The watchdog circuits 751 and 771 send request signals to the first and second control units 71 and 72, and receive reply signals therefrom. When it is judged from the reply signals that the first and second control units 71 and 72 are normal, high level signals are output to the AND circuits 752 and 772, and when it is judged that they are abnormal, low level signals are output to the AND circuits 752 and 772. The output of the NAND circuit 703 of the misfire detection circuit 70 is fed to the AND circuit 752 in the observation circuit 75 of the first control unit. To the remaining input of the AND circuit 752 is connected the output of the watchdog circuit 751 and to the inverted input thereof is connected the output of the AND circuit 772 in the observation circuit of the second control unit. To the inverted input of the AND circuit 772 is connected the output of the AND circuit 752, and to one of the two remaining inputs is connected the output of the watchdog circuit 771, and to the other input is connected an integration circuit 773 made up of a resistor R7 and a capacitor C1.

The integrating circuit 773 is provided for selecting the first control unit 71 when a system power source (power source of the safety control apparatus for an internal combustion engine) is turned on. That is, in this embodiment, the AND circuit 752 and the AND circuit 772 constitute a flip-flop circuit, wherein when one output assumes a high level (permission), the other output assumes a low level (inhibition). The outputs of the AND circuits 752 and 772 assume high levels under a condition where the three inputs are all of the high level (inverted input is the low level). Therefore, when the output of the integrated circuit 773 of the AND circuit 772 is low level at the start of the system, the output of the AND circuit 772 assumes the low level and the output of the AND circuit 752 assumes the high level. FIG. 4B shows the voltage characteristic of the integrated circuit 773 of when the system power source is turned on.

In this embodiment, the control signal permission circuits 74a to 74h and 76a to 76h are constituted by AND circuits, the inputs on one side of the AND circuits 74a to 74h being connected to the output of the AND circuit 752 of the first observation circuit 75, and the inputs on one side of the AND circuits 76a to 76h being connected to the output of the AND circuit 772 of the second observation circuit 77. The inputs on the other side of the AND circuits 74a to 74h are connected to the output of the first control unit 71, and the inputs on the other side of the AND circuits 76a to 76h are connected to the output of the second control unit 72.

In this embodiment, the OR circuits 78a to 78h are each constituted by two diodes, respectively, one of the diodes in the OR circuits 78a to 78h connected to the AND circuits 74a to 74h and the other diode in the OR circuits 78a to 78h connected to the AND circuits 76a to 76h.

In the thus constituted safety control apparatus for an internal combustion engine according to the above-mentioned embodiment, either the AND circuits 74a to 74h or the AND circuits 76a to 76h of the observation circuit 75 or the observation circuit 77 that has produced an output of the high level (permission), are allowed to operate to select either the first control unit 71 or the second control unit 72.

When the occurrence of misfire in the internal combustion engine is detected by the misfire detection circuit 70 by the operation of either the first control unit 71 or the second control unit 72, or when it is judged by either the observation circuit 75 or the observation circuit 77 that the first control unit 71 or the second control unit 72 is abnormal, then, the control system is changed by the observation circuits 75 and 77 over to the control system that is in a standby state.

Figure 4A:
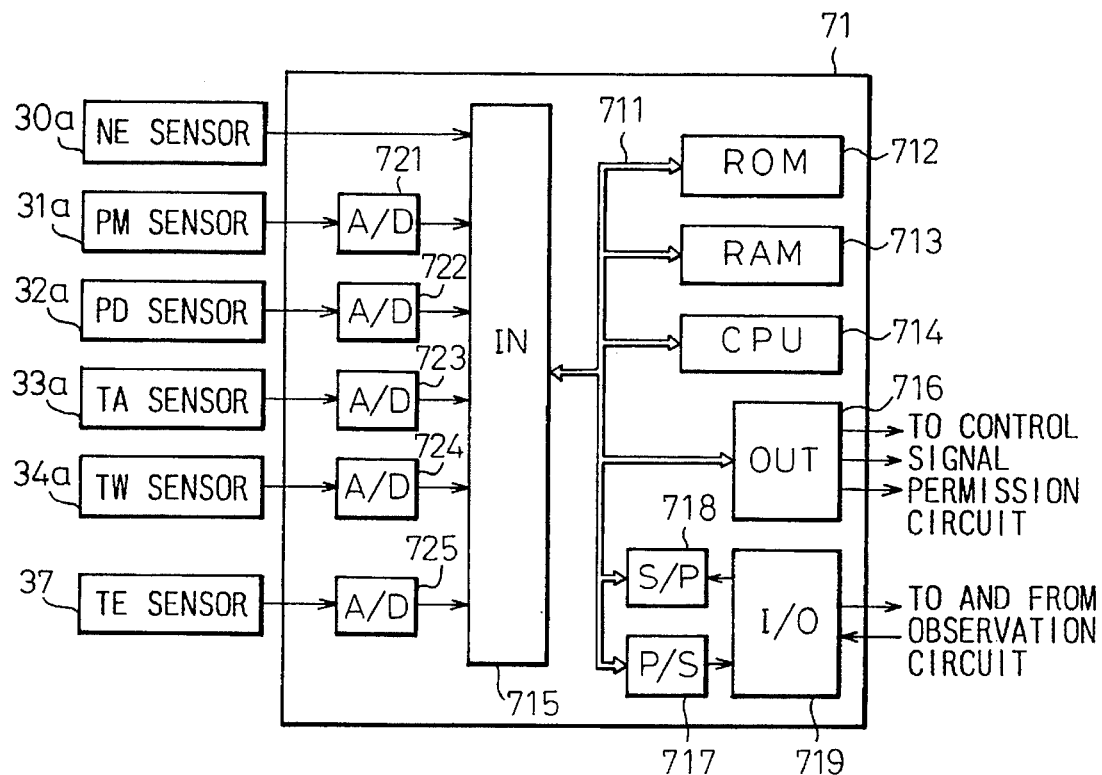
FIG. 4A is a diagram illustrating the constitution of an electronic control unit in FIG. 2.
Figure 4B:
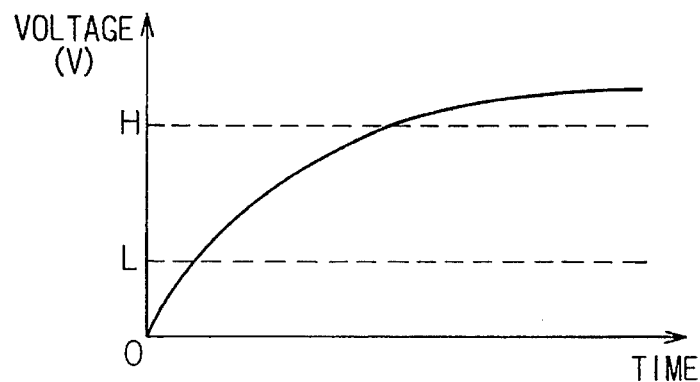
FIG. 4B is a diagram of voltage characteristics illustrating the rising characteristic of the integration circuit in FIG. 3.

FIG. 4A is a diagram illustrating the constitution of the first control unit 71 shown in FIG. 2.

As shown in FIG. 4A, the first control unit 71 is provided with a read-only memory (ROM) 712, a random access memory (RAM) 713, a microprocessor (CPU) 714, an input port (IN) 715, an output port (OUT) 716, a parallel/series converter (P/S) 717, and a series/parallel converter (S/P) 718 which are connected with each other through a bidirectional bus 711. To the parallel/series converter (P/S) 717 and to the series/parallel converter (S/P) 718 are further connected an input/output port (I/O) 719 for communication among the computers or to other control circuits. The output of the NE sensor 30a is directly input to the input port (IN) 715. However, the outputs of the PM sensor 31a, PD sensor 32a, TA sensor 33a, TW sensor 24a and TE sensor 37 are input to the input port (IN) 715 after having been converted into digital signals by the A/D converters 721 to 725.

FIG. 5 is a diagram illustrating the misfire detection circuit and the observation circuits for the first and second control units having another constitution. Here, FIG. 5 only illustrates the misfire detection circuit 70 and the observation circuit 75 for the first control unit 71 and does not illustrate the second control unit 72 and the observation circuit 77 therefor.

In this embodiment, the monitoring circuit 75 is equipped with a read-only memory (ROM) 75b, a random access memory (RAM) 75c, a microprocessor (CPU) 75d, an input port (IN) 75e, an output port (OUT) 75f, a parallel/series converter (P/S) 75g, and a series/parallel converter (S/P) 75h, which are connected to each other through a bidirectional bus 75a. To the parallel/series converter (P/S) 75g and to the series/parallel converter (S/P) 75h are further connected an input/output port (I/O) 75i for communication among the computers and to other control circuits. In the thus constituted observation circuit 75, the output of the NAND circuit 703 of the misfire detection circuit 70 is directly input to the input port (IN) 75e. The observation circuit 75 outputs a request signal to the first control unit 71 through the output port (OUT) 75f and receives a reply signal therefrom through the input port (IN). When it is judged from the reply circuit that the first control unit 71 is normal, a permission signal is output to the control signal permission circuits 74a to 74h from the output port (OUT) 75f and when the first control unit 71 is judged to be abnormal, an inhibition signal is output therefrom. The observation circuit 77 operates in the same manner as the observation circuit 75. As described above, the first and second control units 71 and 72 can be observed by the observation circuits 75 and 77 in combination with a computer.

Figure 6:
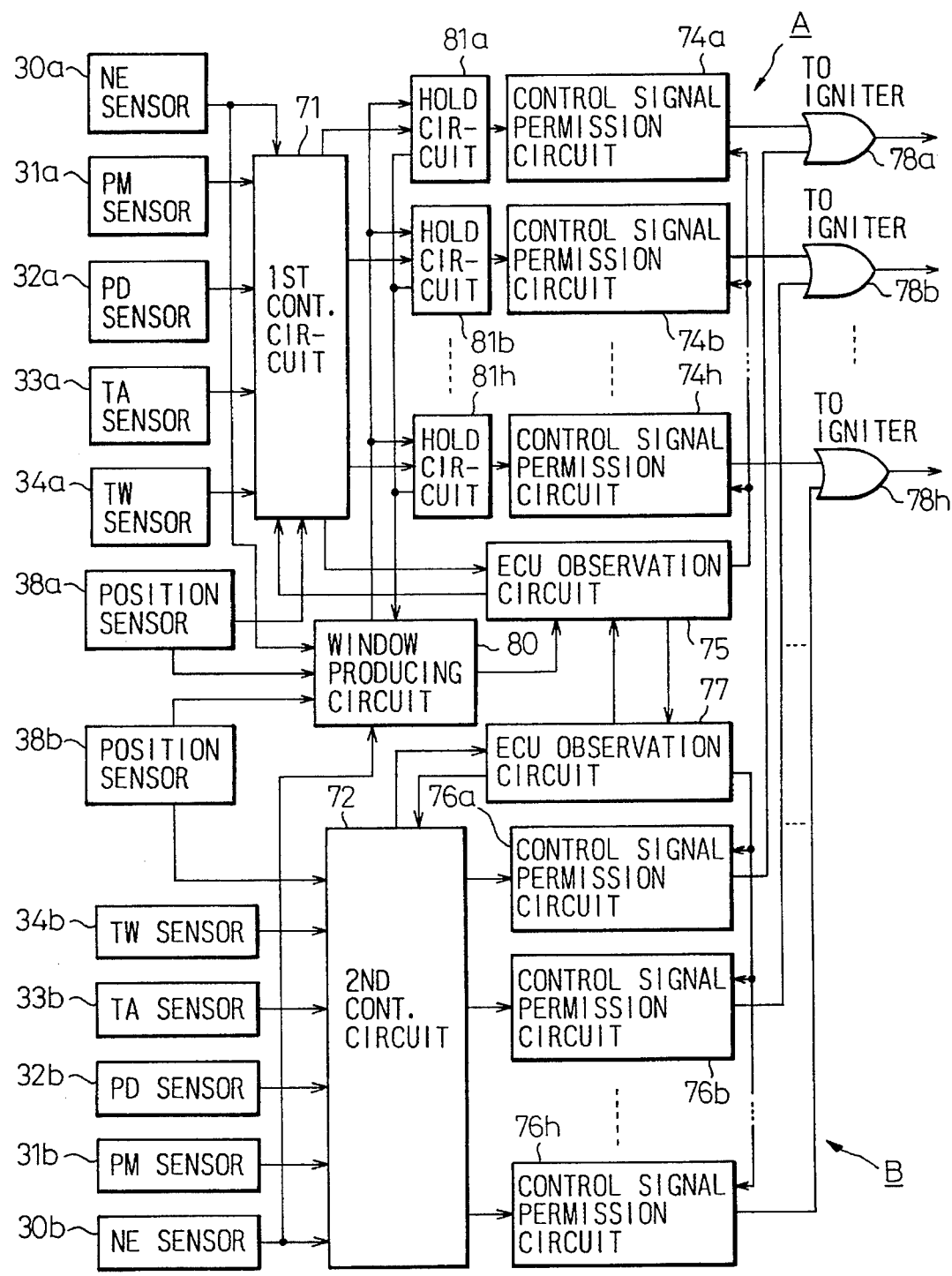
FIG. 6 is a block diagram schematically illustrating the constitution of the safety control apparatus for a reciprocating engine according to a second embodiment of the present invention.

FIG. 6 is a block diagram which schematically illustrates the constitution of the safety control apparatus for an internal combustion engine according to a second embodiment of the present invention. In the safety control apparatus for an internal combustion engine of the second embodiment, the same constituent members as those of the safety control apparatus for an internal combustion engine of the first embodiment are denoted by the same reference numerals.

Even in this embodiment, the control system is constituted by two channels, i.e., a first control system A equipped with a first engine control unit 71 and a second control system B equipped with a second control unit 72.

To the first and second control units 71 and 72 are connected a variety of sensors for detecting engine-running-condition parameters, such as NE sensors 30a and 30b, PM sensors 31a and 31b, PD sensors 32a and 32b, TA sensors 33a and 33b, and TW sensors 34a and 34b. To the first and second control units 71 and 72 are further connected cam position sensors 38a and 38b (simply referred to as position sensors) explained with reference to FIG. 1. The position sensors 38a and 38b are also connected to the window producing circuit 80 for producing a window which is an ignition timing range signal.

The first and second control systems A and B are, respectively, equipped with control signal permission circuits 74a to 74h and 76a to 76h, output OR circuits 78a to 78h, and control unit observation circuits 75 and 77, constituting the same control systems as the pair of control systems shown in FIG. 2. In the second embodiment, however, the actuators for driving the igniter of the engine (not shown) are energized by the output signals from the output OR circuit 78a to 78h.

According to the second embodiment, in addition to the above-mentioned constitution, eight hold circuits 81a, 81b, ..., 81h are provided between the first control unit 71 and the control signal permission circuits 74a to 74h. The hold circuits 81a, 81b, ..., 81h are connected to the window producing circuit 80 to exchange signals to, and from, the window producing circuit 80. The hold circuits 81a, 81b, ..., 81h have a function for holding signals and are, usually, constituted by a logic IC (TTL or the like).

To the window producing circuit 80 are input a detection signal related to engine rotational speed NE from the NE sensors 30a and 30b, and a cam position signal from the position sensors 38a and 38b. The window producing circuit 80 produces an ignition timing range signal (window) from these two signals, feeds the ignition timing range signal to the hold circuits 81a to 81h, and receives status signals from the hold circuits 81a to 81h thereby to detect the ignition timing. Furthermore, when it is so judged that the first control unit 71 is abnormal upon exchanging signals relative to the hold circuits 81a to 81h, the window producing circuit 80 sends an abnormal signal to the control unit observation circuit 75.

In the pair of control systems A and B according to the second embodiment, when it is detected by the control unit observation circuit 75 that the first control unit 71 in the control system A is abnormal, the control system A is changed over to the control system B and the ignition timings to the igniter are controlled without interruption. The hold circuits 81a to 81h work to permit the passage of control signals from the first control unit 71 so far as the ignition timings are normally controlled by the first control unit 71 in the control system A.

Next, described below is the operation for detecting the ignition timing by forming an ignition timing range signal, i.e., a window signal, by using the window producing circuit 80 and the hold circuits 81a to 81h that constitute an ignition timing detection means for detecting pre-ignition.

Figure 7:
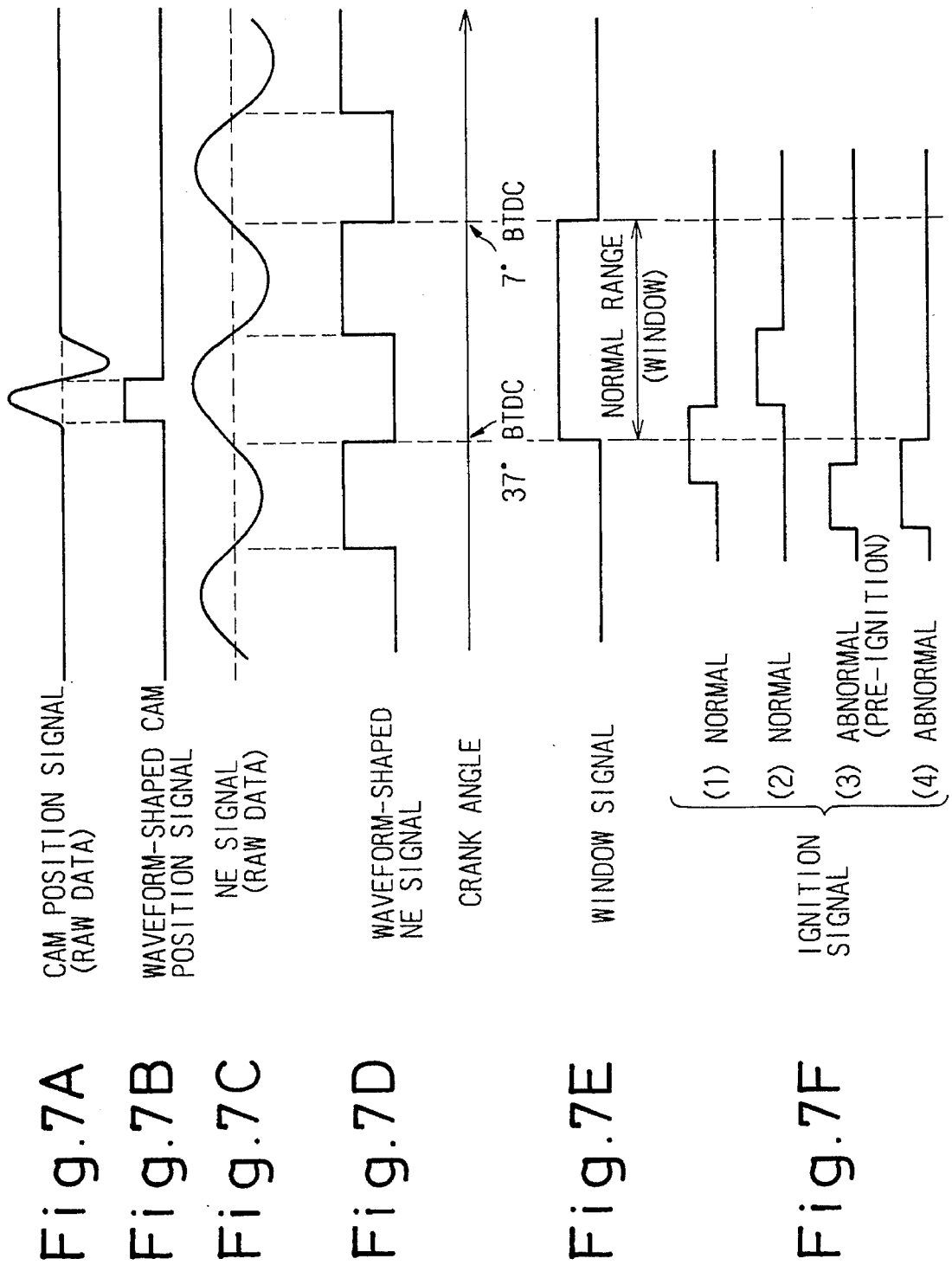
FIG. 7A is a diagram of a raw waveform of a cam position signal according to the second embodiment.
FIG. 7B is a diagram of a waveform of a cam position signal after the waveform is shaped according to the second embodiment.
FIG. 7C is a diagram of a raw waveform of an engine rotational speed signal according to the second embodiment.
FIG. 7D is a diagram of a waveform of the engine rotational speed signal after the waveform is shaped according to the second embodiment.
FIG. 7E is a diagram showing a window signal.
FIG. 7F is a diagram of waveforms illustrating the states of ignition signals in a normal state and in an abnormal state.

FIG. 7A is a diagram of a raw waveform of a cam position signal generated by the cam position sensor 38a according to the second embodiment. The cam position signal represents an actual operation stroke of the engine and comprises, for example, a top-dead-center (TDC) signal of a cylinder #1. The cam position signal waveform is shaped, as shown in FIG. 7B, to obtain a pulse signal which is then fed to the window producing circuit 80.

FIG. 7C is a diagram of a raw waveform of a signal representing the engine rotational speed NE generated by the NE sensor 38a according to the second embodiment. The waveform of the NE signal is shaped, as shown in FIG. 7D to obtain a pulse signal which is then fed to the window producing circuit 80. The engine rotational speed signals NE are produced in a number of, for example, twelve per a turn; i.e., the engine rotational speed signal NE is generated for every crank angle of 30°. The engine rotational speed signal NE is produced 7° in advance (BTDC) of the actual operation stroke of the engine.

When a predetermined ignition timing range, e.g., BTDC 37° to 7°, is regarded as a normal ignition timing range for the cylinder #1, an ignition timing range signal representing the normal ignition timing range is produced by the window producing circuit 80 as a window signal. The window signal for the cylinder #1 is shown in FIG. 7E. Though not diagramed, window signals of 37° to 7° BTDC are similarly produced for each of the cylinders.

The window signals are input from the window producing circuit 80 to the hold circuits 81a to 81h where timings of ignition signals from the first control unit 71 are checked. When the timings of ignition signals are within the respective window signals, the hold circuits 81 to 81h render the judgement that they are normal ignition timings and permit the ignition control signals from the first control unit 71 to pass through to the control signal permission circuits 74a to 74h. In the case of an abnormal ignition timing in which the ignition signal does not exist in the window signal, i.e., in which pre-ignition takes place, on the other hand, the hold circuits 81a to 81h work to hold the ignition signals. At the same time, the hold circuits 81a to 81h sends signals representing abnormality in the ignition timing to the window producing circuit 80.

FIG. 7F illustrates various states of ignition signals for the window signal produced as shown in FIG. 7E, and wherein (1) and (2) are when the ignition signals are normal for the window signal, and (3) and (4) are when the ignition signals are abnormal for the window signal. Normal ignition signals are those of which the breaking points (ignition timings) are within the window. Abnormal ignition signals are those of which the breaking points are before the range of the window signal. In such a case, pre-ignition takes place. When the ignition signals are abnormal, the hold circuits 81a to 81h hold the breakings of ignition signals until the range of the window is reached. In FIG. 7F, (4) represents a state where the breaking in an abnormal ignition signal is held by the hold circuits 81a to 81h up to the range of the window.

In the safety control apparatus for an internal combustion engine according to the second embodiment as described above, the hold circuits 81a to 81h and window producing circuit 80 in combination constitute the ignition timing detection means which is capable of detecting an ignition timing from which pre-ignition can be estimated.

The window producing circuit 80 that has received a signal representing abnormality in the ignition timing, sends an abnormal signal to the control unit observation circuit 75 which, then, sends the abnormal signal to the control unit observation circuit 77. In cooperation with the control unit observation circuit 77, the control unit observation circuit 75 works to forcibly change the engine control from the first control system which has the first control unit 71 over to the second control system B which has the second control unit 72. Therefore, even in case the first control unit 71 is placed in a false normal state permitting pre-ignition to almost take place, the engine control system is changed over from the first control system A to the second control system B before pre-ignition takes place, and the normal ignition control operation is continued.

According to the second embodiment, therefore, the engine control system is changed over by judging the state in which a false normal state is likely to occur by estimating pre-ignition which is another cause of serious trouble in reciprocating engines. According to the safety control apparatus for an internal combustion engine of the second embodiment, therefore, it is possible to prevent in advance serious trouble in which pistons are melted and the engine is damaged by the occurrence of pre-ignition that stems from an increase in the advance of the ignition timing of the engine.

According to the second embodiment, the hold circuits 81a to 81h are provided in the paths of ignition control signals from the control unit in the first control system A, and the control system is changed over when an abnormality in the ignition timing is detected by the window producing circuit 80. It is, however, also possible to change over the engine control system by providing an ignition timing detection means separately from the passages of ignition control signals and by controlling the control unit observation circuit relying upon the detection output. In this case, furthermore, the ignition timing detection means can also be realized by using the software in the other control unit, i.e., in the second control unit 72.

According to the second embodiment, furthermore, the hold circuits 81a to 81h are provided in only the paths of ignition control signals from the control unit in the first control system A, and the control system is changed from the first control system A to the second control system B when an abnormality in the ignition timing is detected by the window producing circuit 80. This constitution makes it possible to control the internal combustion engine and maintain safety to a sufficient degree. In order to further improve safety for the internal combustion engines, however, holding means should be provided even in the paths of the ignition control signals from the control unit 72 in the second control system B, in order to return the second control system B back to the first control system A when abnormality in the ignition timing is detected by the window producing circuit 80.

Figure 8:
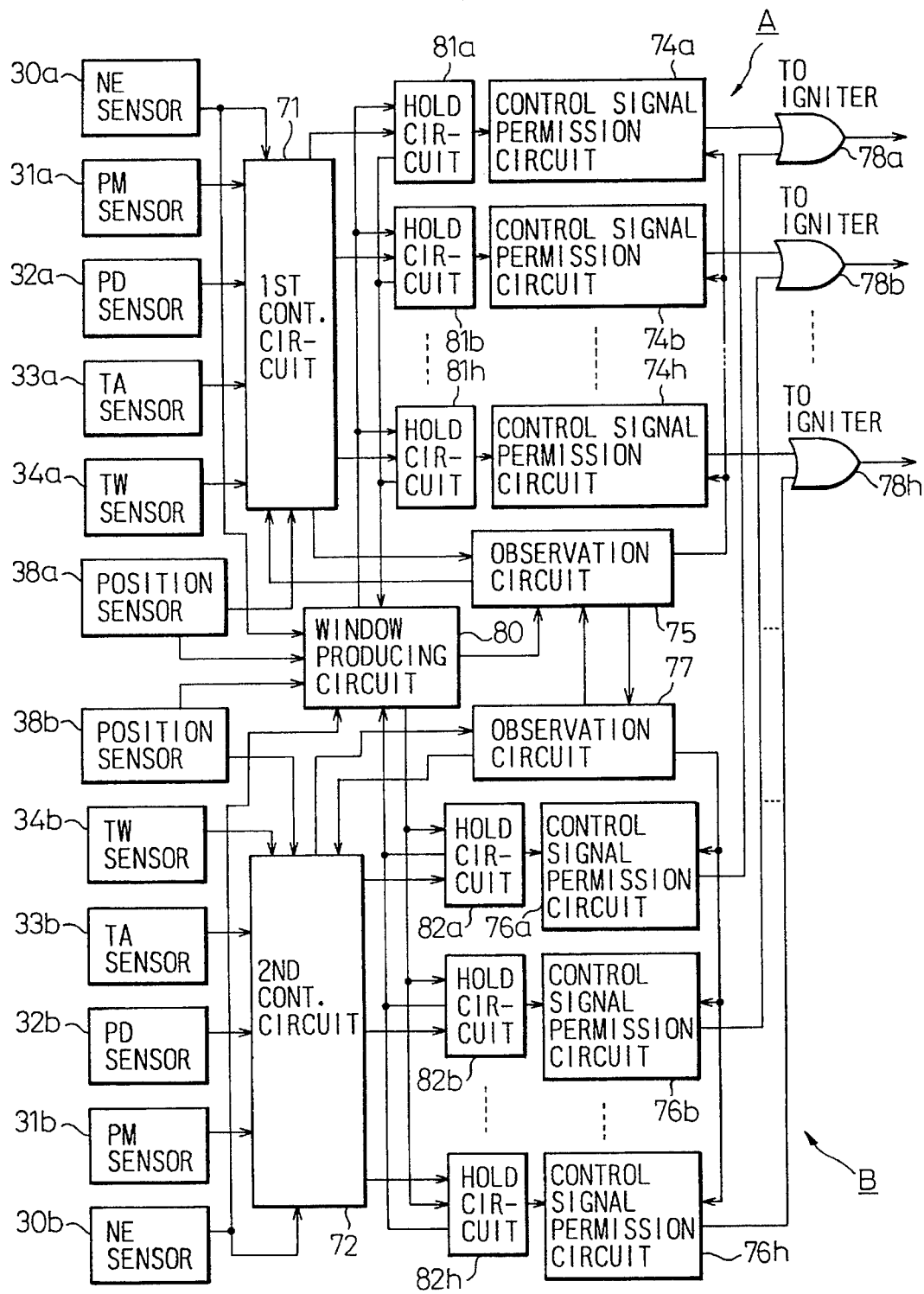
FIG. 8 is a block diagram schematically illustrating the constitution of the safety control apparatus for a reciprocating engine which is modified from the second embodiment of FIG. 6.

FIG. 8 illustrates the constitution of the safety control apparatus for an internal combustion engine, which is a modification from the second embodiment and in which hold circuits 82a to 82h are provided even in the passages of ignition control signals from the control unit 72 in the second control system B. According to this modified embodiment, the second control system B executes an operation which is the same as the operation executed by the first control system A in the safety control apparatus for an internal combustion engine of the second embodiment. Therefore, the same constituent members as those of the second embodiment are denoted by the same reference numerals but their description is not repeated.

The safety control apparatus of each of the aforementioned embodiments works effectively. By using the above safety control apparatuses in combination, however, an improved safety control operation can be accomplished. Though the first and second embodiments have dealt with the cases where the safety control apparatus for an internal combustion engine of the present invention was adapted to the apparatus for controlling a reciprocating engine of aircraft, it should be noted that the present invention can be also adapted to apparatuses for controlling reciprocating engines of automobiles and the like.

Being constituted as described above, the safety control apparatus for an internal combustion engine of the present invention makes it possible to effectively cope with a false normal state in controlling the reciprocating engine by using a relatively cheap computer system.

According to the present invention, furthermore, misfiring and pre-ignition which are causes of serious trouble in reciprocating engines, are detected to determine a state where a computer system could easily assume a false normal state, in order to cope with the situation before serious trouble occurs.

What is claimed is:

1. A safety control apparatus equipped with a pair of control systems for an operation system and a standby system in order to safely control a multi-cylinder reciprocating engine, the pair of control systems comprising:

a first control unit and a second control unit for controlling the engine;

operation observation circuits for said two control units;

an output change-over circuit which is provided on the output sides of said first control unit and said second control unit, and sends the output of either said first control unit or said second control unit to the engine; and a false normal state detection circuit for detecting a false normal state in which a normal signal is output to said observation circuits despite the fact that an abnormal control output is fed to the engine as a result of an abnormal operation in either said first control unit or said second control unit; wherein said operation observation circuit determines that the control system which is now in operation is abnormal by relying upon a false normal state detection signal from said false normal state detection circuit, and works to change the engine control system over to said stand-by system via said output change-over circuit.

2. A safety control apparatus as set forth in claim 1, wherein said false normal state detection circuit is a misfire detection circuit for detecting the occurrence of misfiring in at least one of the cylinders of the engine, and said operation observation circuit judges the control system which is now in operation to be abnormal based upon a misfire detection signal from said misfire detection circuit and changes the engine control system over to said standby system via said output change-over circuit, in order to safety control the fuel injection in the multi-cylinder reciprocating engine.

3. A safety control apparatus for controlling fuel injection as set forth in claim 2, wherein said output change-over circuit is constituted by control signal permission circuits that permit the passage of outputs of said first control unit and said second control unit in response to a permission signal from said operation observation circuit and inhibit the passage thereof in response to an inhibition signal, and OR circuits connected to said control signal permission circuits in said operation system and to said control signal permission circuits in said standby system in order to output the input signals to the injectors in the engine while preventing the input signals from flowing into the other system.

4. A safety control apparatus for controlling fuel injection as set forth in claim 3, wherein said control signal permission circuits are constituted by AND circuits.

5. A safety control apparatus for controlling fuel injection as set forth in claim 4, wherein the observation circuit in said operation system is constituted by a watchdog circuit connected to said first control unit and an AND circuit having three inputs, a first input thereof being connected to the output of said watchdog circuit, a second input thereof being connected to the output of said misfire detection circuit, and a third input thereof being supplied with an input inverted from an output of the operation observation circuit of said standby system, and the observation circuit in said standby system is constituted by a watchdog circuit connected to said second control unit and an AND circuit having three inputs, a first input thereof being connected to the output of said watchdog circuit, a second input thereof being connected to the output of a setting circuit in the standby system which generates a voltage of the low level only when the system power source is turned on, and a third input thereof being supplied with an input inverted from an output of the operation observation circuit of said operation system.

6. A safety control apparatus for controlling fuel injection as set forth in claim 5, wherein said misfire detection circuit judges the state of misfire in the engine depending upon the following conditions:
  (a) at least one signal indicates that a detection temperature is lower than 300° C. among the signals from the temperature sensors that detect exhaust temperatures at the exhaust ports of the engine, and
  (b) a signal from the temperature sensor detecting the exhaust indicates that the temperature in the manifold portion of the exhaust pipe is higher than 470° C.

7. A safety control apparatus for controlling fuel injection as set forth in claim 5, wherein said misfire detection circuit observes the exhaust temperatures of the cylinders and judges that misfire has occurred in the engine when a deviation from the average exhaust temperature of all cylinders is larger than a misfire judgement value.

8. A safety control apparatus for controlling fuel injection as set forth in claim 5, wherein said misfire detection circuit judges that misfire has occurred in the engine when any difference among the exhaust temperatures of the cylinders is larger than the misfire judgement value.

9. A safety control apparatus for controlling fuel injection as set forth in claim 4, wherein the observation circuit of said operation system is constituted by a computer circuit equipped with a CPU, and the occurrence of misfire in the engine is judged by software relying upon an output from said misfire detection circuit.

10. A safety control apparatus as set forth in claim 1, wherein said false normal state detection circuit is an ignition timing detection circuit for detecting an ignition timing in at least one cylinder of the engine, and said operation observation circuit judges that the control system now in operation is abnormal in response to an ignition timing abnormal signal from said ignition timing detection circuit and changes the engine control system over to said standby system via said output change-over circuit in order to safety control the ignition timing of the multi-cylinder reciprocating engine.

11. A safety control apparatus for controlling ignition timing as set forth in claim 10, further comprising an engine rotation speed sensor, a cam position sensor, and detection hold circuits for holding ignition signals from said first control circuit, wherein said ignition timing detection circuit produces a window signal that represents a normal range of ignition timing based on the engine rotation speed and the cam position signal, and judges that the control system now in operation is abnormal when the ignition signal from the hold circuits holding the ignition signals does not lie within the range of the window signal.

12. A safety control apparatus for controlling ignition timing as set forth in claim 11, wherein said output change-over circuit is constituted by control signal permission circuits that permit the passage of outputs of said hold circuits holding said ignition signals in response to a permission signal from said operation observation circuit and inhibit the passage thereof in response to an inhibition signal, and OR circuits connected to said control signal permission circuits in said operation system and to said control signal permission circuits in said standby system in order to output the input signals to the injectors of the engine while preventing the input signals from flowing into the other system.

13. A safety control apparatus for controlling ignition timing as set forth in claim 12, wherein said control signal permission circuits are constituted by AND circuits.

14. A safety control apparatus for controlling ignition timing as set forth in claim 13, wherein the observation circuit in said operation system is constituted by a watchdog circuit connected to said first control unit and an AND circuit having three inputs, a first input thereof being connected to the output of said watchdog circuit, a second input thereof being connected to the output of said window producing circuit, and a third input thereof being supplied with an input inverted from an output of the operation observation circuit of said standby system, and the observation circuit in said standby system is constituted by a watchdog circuit connected to said second control unit and an AND circuit having three inputs, a first input thereof being connected to the output of said watchdog circuit, a second input thereof being connected to the output of a setting circuit in the standby system which generates a voltage at a low level only when the system power source is turned on, and a third input thereof being supplied with an input inverted from an output of the operation observation circuit of said operation system.

15. A safety control apparatus for controlling ignition timing as set forth in claim 11, further comprising hold circuits for holding ignition signals from said second control circuit, wherein said ignition timing detection circuit determines an abnormality not only in said first control circuit but also in said second control circuit by relying upon ignition signals from the two hold circuits for holding the ignition signals, so that the control systems can be changed over when either control system is abnormal.

* * * * *